E. A. POND.
Sphygmoscope.

No. 161,821.

Patented April 6, 1875.

UNITED STATES PATENT OFFICE.

ERASMUS A. POND, OF RUTLAND, VERMONT.

IMPROVEMENT IN SPHYGMOSCOPES.

Specification forming part of Letters Patent No. 161,821, dated April 6, 1875; application filed March 23, 1875.

*To all whom it may concern:*

Be it known that I, ERASMUS A. POND, of Rutland, Vermont, have invented certain new and useful Improvements in Sphygmoscopes, of which the following is a specification:

My invention is directed to an instrument or apparatus for viewing the movements of the pulse, or of any pulsating body or substance.

The essential parts of my instrument are a liquid reservoir or receptacle; an opening in the same, which, whether closed by an elastic and yielding membrane or not, is to be applied to or over the pulsating body; and a fine transparent terminal tube, communicating at one end with the reservoir or receptacle, into which tube the liquid, when the open end of the receptacle is pressed on the pulsating body, will enter, and will therein rise and fall to accord with the movement of the pulsating body, said movement being considerably magnified by the moving liquid, owing to the small diameter of the tube in which it is received.

My invention is susceptible of being carried into effect in very many ways.

In the accompanying drawing I have represented three of the many forms of instruments that may be adopted.

Figure 1:
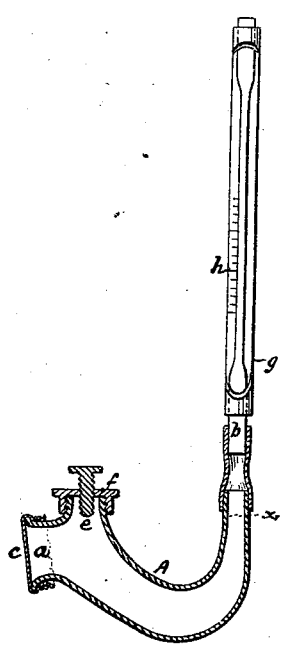
Figure 2:
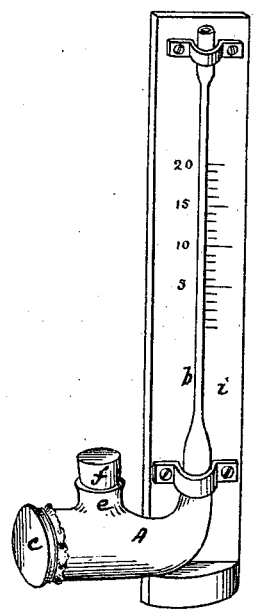
Figure 3:
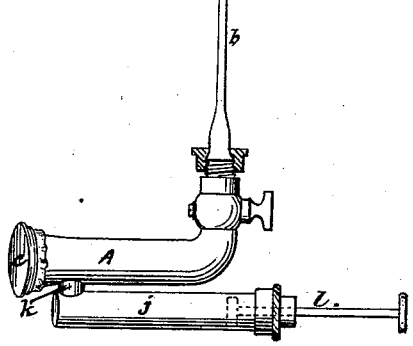

In Figure 1, A is an irregular glass tube, which constitutes the main receptacle or reservoir. It has an opening, $a$, at one end, and is united by a suitable connection or coupling at the other end with the terminal glass tube $b$. The coupling in this instance is a rubber sleeve, $d$. The diameter of the opening $a$ is considerably greater than the diameter of the terminal tube. For instance, the diameter of $a$ may be seven-sixteenths of an inch, while that of the terminal tube may be three-sixty-fourths of an inch. These dimensions are given simply as illustrations. They may vary considerably. To adapt the instrument to be conveniently and readily used I prefer to close the opening $a$ by a thin membrane, $c$, of some suitable elastic substance, such, for instance, as rubber, which prevents the liquid from escaping, and at the same time allows the vibrations of the pulse to effect the liquid. In the receptacle A is another opening, $e$, closed by a cork, rubber, or other suitable stopper, $f$. Through this opening the liquid is poured into and from the receptacle. The receptacle A is to be filled or partly filled with a liquid, so that its movements may be more readily perceived. When the receptacle is thus filled it will contain a column of liquid, which, when balanced, should reach to about the point $x$. Now, if the open end $a$ be applied over the pulse at the wrist or elsewhere, the slight pressure of the instrument against the wrist will be sufficient to send the liquid up into the terminal tube, and the vibrations of the pulse will at once be communicated to the liquid, by whose rise and fall the pulse-action will be made plainly visible, so that the eye can see and detect the pulsations and all the qualities of force, irregularity, or other variation that may exist. The cork or stopper $f$ may serve as a piston, so that, by forcing it more or less in, the column of liquid can be made to stand, normally, at any desired height; or a piston device may be either combined with the cork or located at some other point in the instrument for the same purpose. For instance, an arrangement such as shown in Fig. 3 can be employed. In that figure A is the receptacle, which, in this case, may be supposed to be made of metal or hard rubber. $b$ is the terminal tube, united with it by a screw-coupling. $j$ is an auxiliary liquid-containing reservoir, communicating with A by a duct, $k$, and provided with a piston, $l$, by which liquid can be forced into or drawn from the main reservoir at pleasure. The auxiliary reservoir may be a fixture, or it may be removable from the main receptacle. In the latter case it is preferable to provide the duct $k$ with a stop-cock. A stop-cock can also be arranged on the neck of the receptacle just below the screw-coupling joint of the terminal tube. The terminal tube can be protected by a half-tube, $g$, of metal, rubber, or other material, which may have attached to or formed on it a scale, $h$, to assist the eye in measuring and determining the pulsations; or the terminal tube may be fixed to a graduated plate, $i$, as seen in Fig. 2.

The tube may be fixed to or formed in one piece with the receptacle; but I prefer to make it detachable, to admit of the use of interchangeable tubes of different calibers. It may be of the same diameter throughout, or it may be tapering. I prefer, on the whole, the form of the tube shown in Figs. 1 and 2, where it is composed of a slender stem with enlarged ends or heads, a marked advantage of this arrangement being that when air is permitted to remain in the instrument with the liquid a detached drop of liquid may be seen in the tube as an index separated from the main body of the liquid by intervening air, and when this index is driven to the extremity of the tube a reversed pulse can be seen, so that the rise or fall of the pulse or the increase and decrease of the vibration can be received at any time, if desired. The terminal tube can also be formed by placing one tube within another, or by putting a solid core of wire, for instance, within a tube, so as to leave a small annular passage for liquid. The scale $h$ may be formed on the tube itself, if desired.

A permanent record of the vibrations can be had by the photographic process. The liquid in this case should be somewhat opaque; and the same result can be obtained by means of a writing or recording apparatus, connected with and operated by a delicate membrane stretched over the enlarged end of the terminal tube. The instrument would thus combine with its other functions the function of a sphygmograph. The membrane or elastic diaphragm can be fastened to the body A, in any suitable way. It may, for instance, be mounted on an annulus, that can be screwed onto the open end of A; or the annulus may have a tapering interior, to permit it to be wedged on the correspondingly-shaped end of A. The terminal tube, if desired, may be formed in one piece with the glass body A.

Having described my invention, what I claim, and desire to secure by Letters Patent, is—

1. A sphygmoscope having a liquid-receptacle provided with an opening, adapted to be applied over the pulsating part or body, in combination with a terminal tube, of small diameter, communicating with said receptacle, as set forth.

2. The combination of the liquid-receptacle provided with the open end for application over the pulsating part, as described, the membrane closing said end, and the terminal tube communicating with said receptacle, substantially as shown and set forth.

3. In combination with the liquid-receptacle of the sphygmoscope, a piston or its equivalent, as described, to regulate the normal height of the liquid column in the instrument, as set forth.

4. In combination with the liquid-receptacle of the sphygmoscope, the auxiliary reservoir, and the piston for regulating the supply of liquid from said reservoir to the receptacle, as set forth.

5. The terminal tube formed with a slender stem and enlarged ends, substantially as and for the purposes set forth.

In testimony whereof I have hereunto signed my name this 22d day of February, A. D. 1875.

E. A. POND.

Witnesses:
 WM. CHAS. BROWN,
 H. M. BAILEY.